(12) United States Patent
Chin et al.

(10) Patent No.: US 7,142,937 B1
(45) Date of Patent: Nov. 28, 2006

(54) CAPACITY MANAGEMENT IN A WAFER FABRICATION PLANT

(75) Inventors: Chen Chong Chin, Singapore (SG); Hsiang Ju Su, Singapore (SG); Yew Kuan Ho, Singapore (SG)

(73) Assignee: Systems on Silicon Manufacturing Company Pte. Ltd., Singapore (SG)

( * ) Notice: Subject to any disclaimer, the term of this patent is extended or adjusted under 35 U.S.C. 154(b) by 0 days.

(21) Appl. No.: 11/127,314

(22) Filed: May 12, 2005

(51) Int. Cl.
*G06F 19/00* (2006.01)
*G05B 19/418* (2006.01)

(52) U.S. Cl. .................. 700/99; 700/103; 700/121; 705/8

(58) Field of Classification Search .......... 700/99–104, 700/106, 121; 705/8
See application file for complete search history.

(56) References Cited

U.S. PATENT DOCUMENTS 5,444,632 A * 8/1995 Kline et al. ............... 700/100
5,950,170 A * 9/1999 Pan et al. ...................... 705/7

\* cited by examiner

*Primary Examiner*—Leo Picard
*Assistant Examiner*—Sean Shechtman
(74) *Attorney, Agent, or Firm*—Rothwell, Figg, Ernst & Manbeck (57) ABSTRACT

In a wafer fabrication plant, the capacity management process 10 begins with identifying an initial capacity plan based on a demand plan (step 12). For each Product Group in the initial capacity plan a consumption sensitivity factor is defined (step 14). Next, a bottleneck capability variable is calculated (step 16). The capacity boundaries for each of the product groups are next determined (step 18). Thereafter, in the first of two branches, a determination of maximum wafer output is then performed for changing Product Group mixes to determine a maximum (step 20). The Product Group mix giving maximum wafer output is then determined for the fabrication plant (step 22). In the second branch, a determination of maximum profit is performed for changing Product Group mixes (step 24), then the Product Group mix giving maximum profit is determined for the fabrication plant (step 26).

10 Claims, 9 Drawing Sheets

Fig. 1

| Product Group | Max Capacity | Initial Capacity | Bottleneck (ADxx) | | | Bottleneck |
|---|---|---|---|---|---|---|
| | by Product | from Demand Plan | PASS | WPH | Sensitivity Factor | Capability |
| X Product | 15300 ($X_{max}$) | 14000 ($X_0$) | 15 | 68 | 0.220588 (a) | 3088 (a*$X_0$) |
| Y Product | 8000 ($Y_{max}$) | 6800 ($Y_0$) | 18 | 65 | 0.276923 (b) | 1883 (b*$Y_0$) |
| Z Product | 5000 ($Z_{max}$) | 4000 ($Z_0$) | 12 | 70 | 0.171429 (c) | 686 (c*$Z_0$) |
| | | 24800 ($OUT_0$) | | | | 5657 ($CAPA_0$) |

Fig. 2

|  | % of Product | | Product Group | | | Capability Used | Wafer Out |
|---|---|---|---|---|---|---|---|
| Mix No. (i) | % of Z | % of Y | X | Y | Z | | |
| 0 | 16% | 33% | 14000 | 6800 | 4000 | 5657 | 24800 |
| 1 | 0% | 0% | 15300 | 0 | 0 | 3375 | 15300 |
| 2 | 0% | 20% | 15300 | 3825 | 0 | 4434 | 19125 |
| 3 | 0% | 40% | 12000 | 8000 | 0 | 4863 | 20000 |
| 4 | 0% | 60% | 5334 | 8000 | 0 | 3392 | 13334 |
| 5 | 0% | 80% | 2000 | 8000 | 0 | 2657 | 10000 |
| 6 | 0% | 100% | 0 | 8000 | 0 | 2215 | 8000 |
| 7 | 20% | 0% | 15300 | 0 | 3825 | 4031 | 19125 |
| 8 | 20% | 20% | 15300 | 3825 | 4781 | 5254 | 23906 |
| 9 | 20% | 40% | 11869 | 7912 | 4945 | 5657 | 24727 |
| 10 | 20% | 60% | 5334 | 8000 | 3333 | 3963 | 16667 |
| 11 | 20% | 80% | 2000 | 8000 | 2500 | 3085 | 12500 |
| 12 | 20% | 100% | 0 | 8000 | 2000 | 2558 | 10000 |
| 13 | 40% | 0% | 7500 | 0 | 5000 | 2512 | 12500 |
| 14 | 40% | 20% | 6000 | 1500 | 5000 | 2596 | 12500 |
| 15 | 40% | 40% | 4500 | 3000 | 5000 | 2681 | 12500 |
| 16 | 40% | 60% | 3000 | 4500 | 5000 | 2765 | 12500 |
| 17 | 40% | 80% | 1500 | 6000 | 5000 | 2850 | 12500 |
| 18 | 40% | 100% | 0 | 7500 | 5000 | 2934 | 12500 |
| 19 | 60% | 0% | 3334 | 0 | 5000 | 1592 | 8333 |
| 20 | 60% | 20% | 2667 | 667 | 5000 | 1630 | 8333 |
| 21 | 60% | 40% | 2000 | 1333 | 5000 | 1668 | 8333 |
| 22 | 60% | 60% | 1333 | 2000 | 5000 | 1705 | 8333 |
| 23 | 60% | 80% | 667 | 2667 | 5000 | 1743 | 8333 |
| 24 | 60% | 100% | 0 | 3333 | 5000 | 1780 | 8333 |
| 25 | 80% | 0% | 1250 | 0 | 5000 | 1133 | 6250 |
| 26 | 80% | 20% | 1000 | 250 | 5000 | 1147 | 6250 |
| 27 | 80% | 40% | 750 | 500 | 5000 | 1161 | 6250 |
| 28 | 80% | 60% | 500 | 750 | 5000 | 1175 | 6250 |
| 29 | 80% | 80% | 250 | 1000 | 5000 | 1189 | 6250 |
| 30 | 80% | 100% | 0 | 1250 | 5000 | 1203 | 6250 |
| 31 | 100% | 0% | 0 | 0 | 5000 | 857 | 5000 |
| 32 | 19.6% | 25.2% | 15300 | 5145 | 5000 | 5657 | 25445 |

: the reference point
: the max point

| Product Group | ASP (US$/pcs) | STD COST (US$/pcs) | Margin Profit (US$/pcs) |
|---|---|---|---|
| X Product | 1300 | 1000 | 300 (PFx) |
| Y Product | 1800 | 1300 | 500 (PFy) |
| Z Product | 1000 | 900 | 100 (PFz) |

Fig. 6

| Mix No. (i) | % of Product | | Product Group | | | Capability Used | Wafer Out | Profit (US$) |
|---|---|---|---|---|---|---|---|---|
| | % of Z | % of Y | X | Y | Z | | | |
| 0 | 16% | 33% | 14000 | 6800 | 4000 | 5657 | 24800 | 8000000 |
| 1 | 0% | 0% | 15300 | 0 | 0 | 3375 | 15300 | 4590000 |
| 2 | 0% | 20% | 15300 | 3825 | 0 | 4434 | 19125 | 6502587 |
| 3 | 0% | 40% | 12000 | 8000 | 0 | 4863 | 20000 | 7600147 |
| 4 | 0% | 60% | 5334 | 8000 | 0 | 3392 | 13334 | 5600063 |
| 5 | 0% | 80% | 2000 | 8000 | 0 | 2657 | 10000 | 4599940 |
| 6 | 0% | 100% | 0 | 8000 | 0 | 2215 | 8000 | 4000000 |
| 7 | 20% | 0% | 15300 | 0 | 3825 | 4031 | 19125 | 4972519 |
| 8 | 20% | 20% | 15300 | 3825 | 4781 | 5254 | 23906 | 6980716 |
| 9 | 20% | 40% | 11869 | 7912 | 4945 | 5657 | 24727 | 8011380 |
| 10 | 20% | 60% | 5334 | 8000 | 3333 | 3963 | 16667 | 5933410 |
| 11 | 20% | 80% | 2000 | 8000 | 2500 | 3085 | 12500 | 4849935 |
| 12 | 20% | 100% | 0 | 8000 | 2000 | 2558 | 10000 | 4200000 |
| 13 | 40% | 0% | 7500 | 0 | 5000 | 2512 | 12500 | 2749922 |
| 14 | 40% | 20% | 6000 | 1500 | 5000 | 2596 | 12500 | 3050154 |
| 15 | 40% | 40% | 4500 | 3000 | 5000 | 2681 | 12500 | 3350000 |
| 16 | 40% | 60% | 3000 | 4500 | 5000 | 2765 | 12500 | 3649999 |
| 17 | 40% | 80% | 1500 | 6000 | 5000 | 2850 | 12500 | 3950000 |
| 18 | 40% | 100% | 0 | 7500 | 5000 | 2934 | 12500 | 4250000 |
| 19 | 60% | 0% | 3334 | 0 | 5000 | 1592 | 8333 | 1499966 |
| 20 | 60% | 20% | 2667 | 667 | 5000 | 1630 | 8333 | 1633341 |
| 21 | 60% | 40% | 2000 | 1333 | 5000 | 1668 | 8333 | 1766656 |
| 22 | 60% | 60% | 1333 | 2000 | 5000 | 1705 | 8333 | 1900006 |
| 23 | 60% | 80% | 667 | 2667 | 5000 | 1743 | 8333 | 2033333 |
| 24 | 60% | 100% | 0 | 3333 | 5000 | 1780 | 8333 | 2166667 |
| 25 | 80% | 0% | 1250 | 0 | 5000 | 1133 | 6250 | 874937 |
| 26 | 80% | 20% | 1000 | 250 | 5000 | 1147 | 6250 | 924999 |
| 27 | 80% | 40% | 750 | 500 | 5000 | 1161 | 6250 | 975004 |
| 28 | 80% | 60% | 500 | 750 | 5000 | 1175 | 6250 | 1024999 |
| 29 | 80% | 80% | 250 | 1000 | 5000 | 1189 | 6250 | 1074999 |
| 30 | 80% | 100% | 0 | 1250 | 5000 | 1203 | 6250 | 1124999 |
| 31 | 100% | 0% | 0 | 0 | 5000 | 857 | 5000 | 499999 |
| 32 | 1.6% | 34.3% | 15300 | 8000 | 389 | 5657 | 23689 | 8628874 |

: the original plan
 : the max point

CAPACITY MANAGEMENT IN A WAFER FABRICATION PLANT

FIELD OF THE INVENTION

The invention relates broadly to a method for the management of capacity in a wafer fabrication plant and to a computer program product for the management of capacity in a wafer fabrication plant.

BACKGROUND

Semiconductor wafer fabrication plants typically produce thousands of devices per day and may be configurable to fabricate two, three or more different product groups/types. E.g. commercial 8 inch wafer fabrication plants costs typically US$1.5 billion to build, representing a significant capital investment for even the largest enterprises.

Profitability is of vital importance to the operators and owners of wafer fabrication plants, and such people endeavour to improve profitability without relying only on further capital expense in installed equipment. There thus is a need to optimise the use of existing installed equipment.

As mentioned, wafer fabrication plants will produce more than one semiconductor product. Conventionally, the mix of products being manufactured at any one time is based on a demand plan and a derived corresponding initial capacity plan. Such initial capacity plans are reactive to customer ordering, and associated with a tooling plan. But conventional initial capacity plans are not optimised, and thus there is a need to improve upon them, with the goal of improved profitability or plant output.

SUMMARY

In accordance with a first aspect of the present invention there is provided a method for the management of capacity in a wafer fabrication, the method comprising the steps of (a) calculating a bottleneck capacity factor for a product group mix of an initial capacity plan; (b) calculating a respective maximum capacity for each product group in the capacity plan; (c) algorithmically determining a respective production value for different product group mixes, including for the product group mix of the initial capacity plan, subject to said bottleneck capacity factor and said respective maximum capacities not being exceeded; (d) determining a maximum one of said production values; and (e) determining the product group mix for said maximum production value.

Said bottleneck capacity factor may be calculated as the sum of respective weighted maximum capacities for the individual product groups.

Each said product group weighting may be proportional to the sum of passes of a bottleneck tool of said fabrication plant for each piece of the respective product group and is inversely proportional to a production rate of the respective product group.

In step (c), said respective production values may be a measure of total wafer output provided for the respective product group mixes.

In step (c), said respective production values may be a measure of profit provided for the respective product group mixes.

In accordance with a second aspect of the present invention there is provided a computer program product for the management of capacity in a wafer fabrication plant comprising a computer program stored on a storage medium, said computer program performing the steps of (a) calculating a bottleneck capacity factor for a product group mix of an initial capacity plan; (b) calculating a respective maximum capacity for each product group in the capacity plan; (c) algorithmically determining a respective production value for different product group mixes, including for the product group mix of the initial capacity plan, subject to said bottleneck capacity factor and said respective maximum capacities not being exceeded; (d) determining a maximum one of said production values; and (e) determining the product group mix for said maximum production value.

Said bottleneck capacity factor may be calculated as the sum of respective weighted maximum capacities for the individual product groups.

Each said product group weighting may be proportional to the sum of passes of a bottleneck tool of said fabrication plant for each piece of the respective product group and is inversely proportional to a production rate of the respective product group.

In step (c), said respective production values may be a measure of total wafer output provided for the respective product group mixes.

In step (c), said respective production values may be a measure of profit provided for the respective product group mixes.

DETAILED DESCRIPTION

Overview

A wafer fabrication plant typically produces semiconductor devices using a large number and variety of basic fabrication steps. The steps will depend upon the form (eg. MOS) of device being fabricated, the nature of the gate (eg. metal or polysilicon) and the substrate (eg. bulk silicon or silicon-on-sapphire). In silicon-gate processes a number of discrete sub-processes are performed. By way of broad example, the steps can include the definition of active regions, definition of depletion loads, polysilicon-defusion interconnect, definition of transistors and polysilicon-defusion contacts, defusion, polysilicon-metal and defusion-metal interconnects, metallisation and annealing and passivation. All of these processes and sub-processes require complex and expensive equipment or tools. It is often the case that one process step and corresponding tool is used for all product groups being fabricated.

Figure 1:
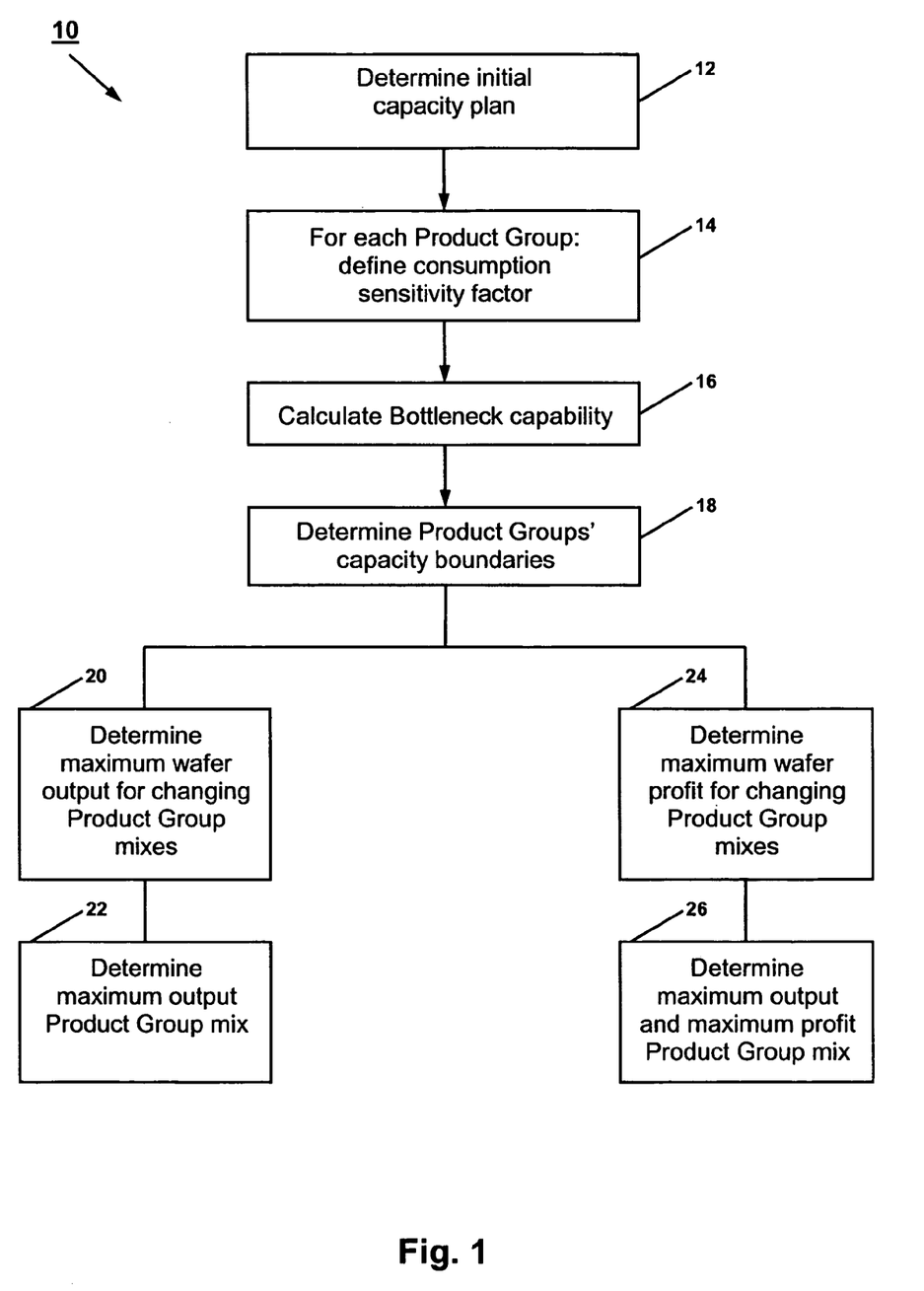
FIG. 1 is a schematic block diagram embodying the invention.

FIG. 1 shows a block flow diagram embodying capacity management in a wafer fabrication plant, according to the present invention. The capacity management process 10 begins with identifying an initial capacity plan based on a demand plan (step 12). For each Product Group in the initial capacity plan, a consumption sensitivity factor is defined (step 14). Next, a bottleneck capability variable is calculated (step 16). The capacity boundaries for each of the product groups are next determined (step 18).

Thereafter, in the first of two branches, a determination of maximum wafer output is then performed for changing Product Group mixes to determine a maximum (step 20). The Product Group mix giving maximum wafer output is then determined for the fabrication plant (step 22). In the second branch, a determination of maximum profit is performed for changing Product Group mixes (step 24), then the Product Group mix giving maximum profit is determined for the fabrication plant (step 26).

SPECIFIC EXAMPLE

Assume X,Y,Z . . . are Product Groups in the Fabrication plant. Then, the reference fabrication output ($OUT_0$) is given by:

$$OUT_0 = X_0 + Y_0 + Z_0 + \ldots \quad 1$$

For the purposes of illustration, three Product Groups will be assumed, although there can, of course, be any desired number.

Figure 2:
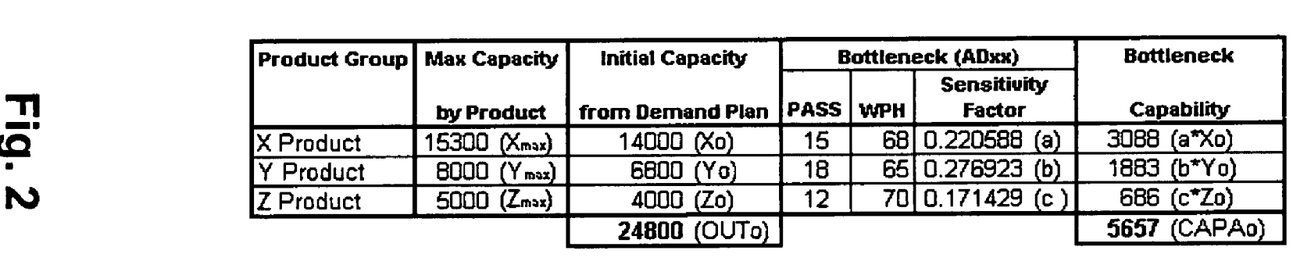
FIG. 2 is a tabulation of variables leading to the bottleneck capacity measure.

Referring to FIG. 2, for the three Product Groups X, Y, Z a known respective maximum capacity (in e.g. pieces/month) is given: $X_{max}$=15,300, $Y_{max}$=8,000 and $Z_{max}$=5,000. The initial capacity plan specifies an initial capacity for each Product Group: $X_0$=14,000, $Y_0$=6,800 and $Z_0$=4,000. The determined output, $OUT_0$, thus is 24,800, in accordance with Equation 1. The initial percentage Product group mix according to the initial capacity plan of X %: Y %: Z % is equal to 100%: 33%: 16%.

For each of the Product Groups, the sum of passes ($PASS_{x,y,z}$) for the process using the bottleneck tool, together with the weighted wafer per hour ($WPH_{x,y,z}$), are given as:

$PASS_{x,y,z}$: sum of passes of the process using bottleneck tool for each piece of product group X, Y, Z $WPH_{x,y,z}$: weighted WPH of process passes for each product group X, Y, Z The values of $PASS_{x,y,z}$ and $WPH_{x,y,z}$ are given in FIG. 2.

A Product Group Consumption Sensitivity Factor for each Product Group is defined as:

$$a = \frac{PASS_X}{WPH_X}, \quad b = \frac{PASS_Y}{WPH_Y}, \quad c = \frac{PASS_Z}{WPH_Z} \quad 2$$

The values of a, b and c are also given in FIG. 2.

Therefore the maximum Bottleneck Capability ($CAPA_0$) in the example embodiment is calculated as:

$$CAPA_0 = aX_0 + bY_0 + cZ_0 \quad 3$$

Therefore, the maximum Bottleneck Capability for the data shown in FIG. 2, calculated in accordance with Equation 3, gives the value 5,657 as available machine hours per month in the example embodiment.

The Product Groups' Capacity Boundaries $X_{max}$, $Y_{max}$, $Z_{max}$ are defined as:

$X_{max}$=Max capacity of X product group due to dedicated tool(s)

$Y_{max}$=Max capacity of Y product group due to dedicated tool(s)

$Z_{max}$=Max capacity of Z product group due to dedicated tool(s)

Maximum Wafer Output

The objective is to maximize wafer output in accordance with Equation 4 for Product Group mix combinations. This determination is subject to boundary conditions given by Equations 5 and 6:

$$\text{Maximize } OUT_i = X_i + Y_i + Z_i \text{ where i: any mix combination} \quad 4$$

$$\text{Boundary(1): } CAPA_i = aX_i + bY_i + cZ_i \leq CAPA_0 \quad 6$$

$$\text{Boundary(2): } X_i \leq X_{max}, Y_i \leq Y_{max}, Z_i \leq Z_{max} \quad 5$$

Figure 3:
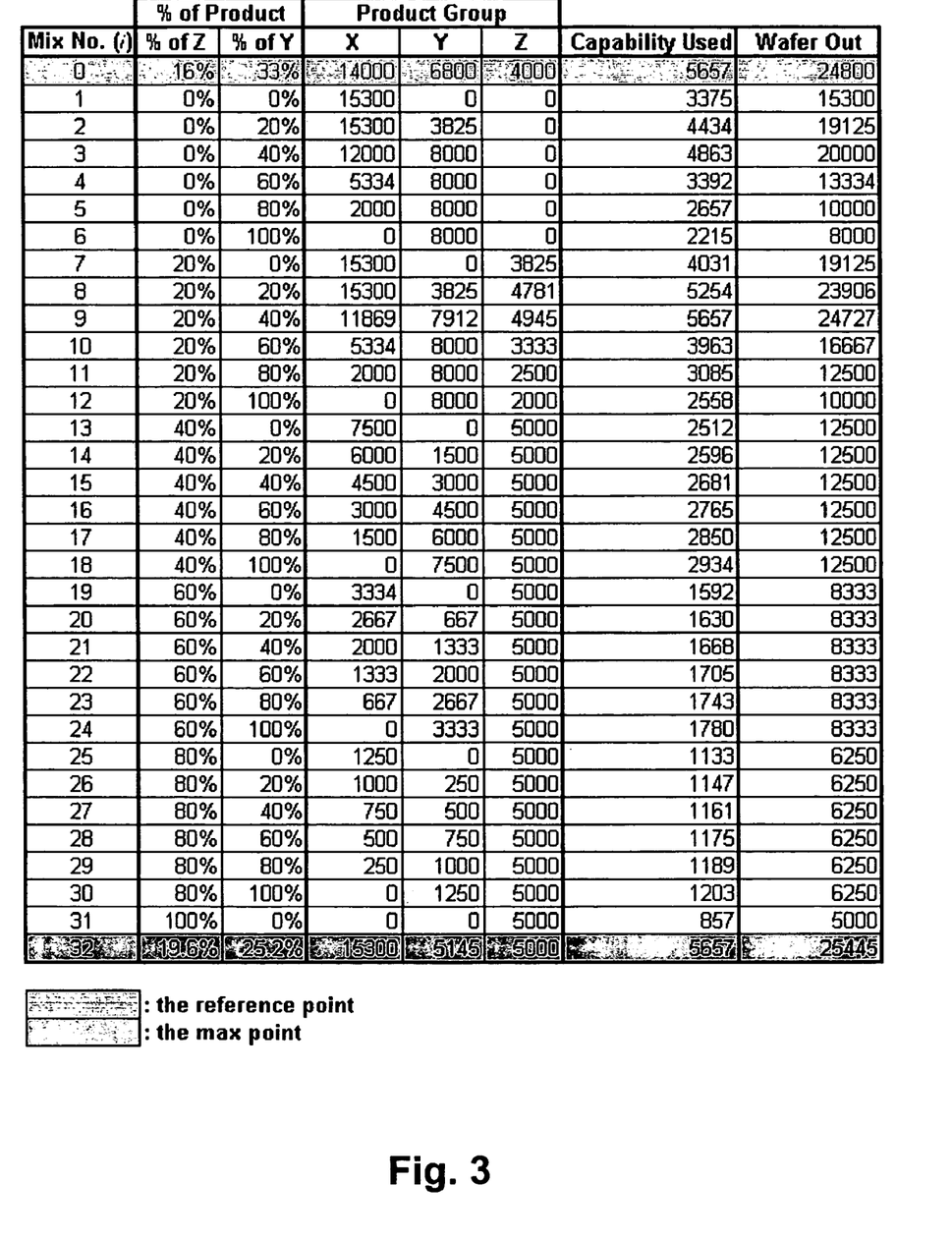
FIG. 3 is a tabulation of variables for various mix combinations leading to maximum wafer output.
Figure 4:
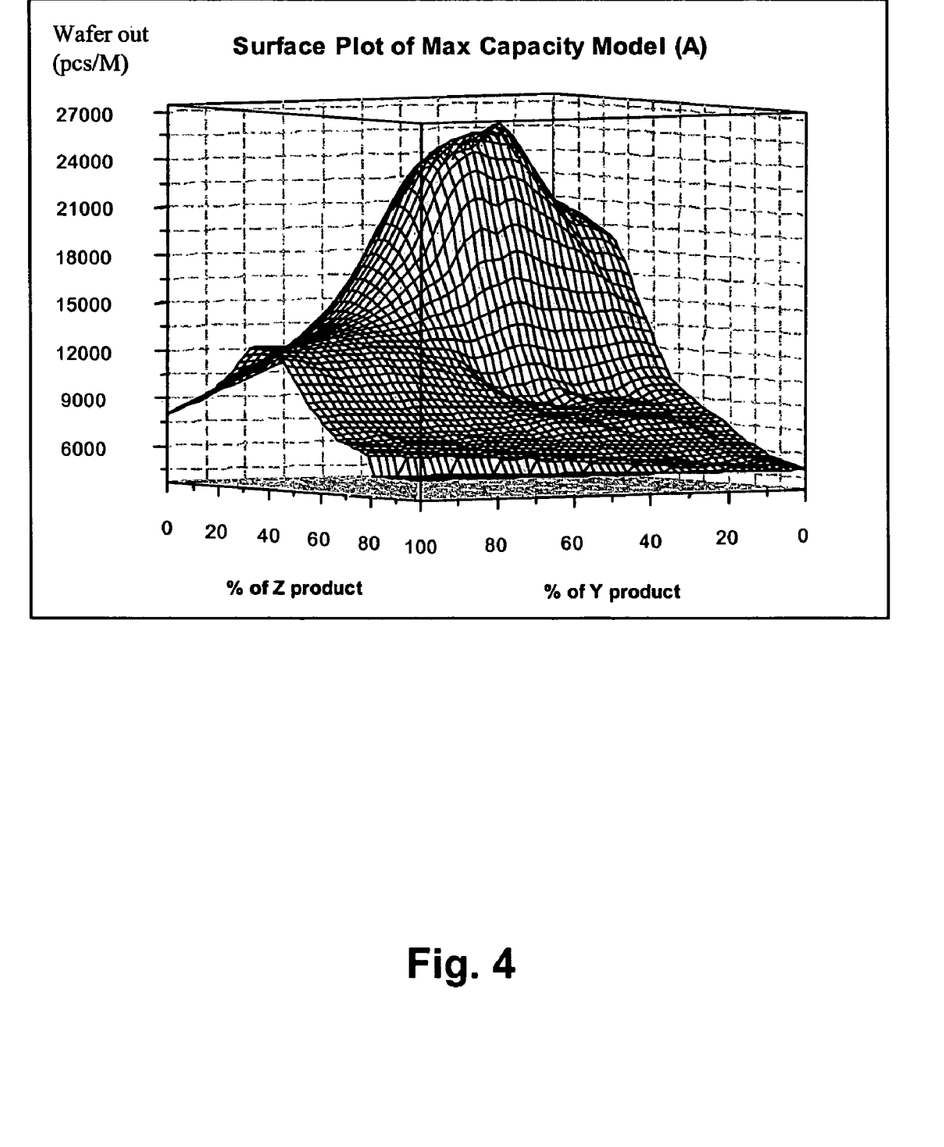
FIG. 4 is a surface plot of the data of FIG. 3.
Figure 5:
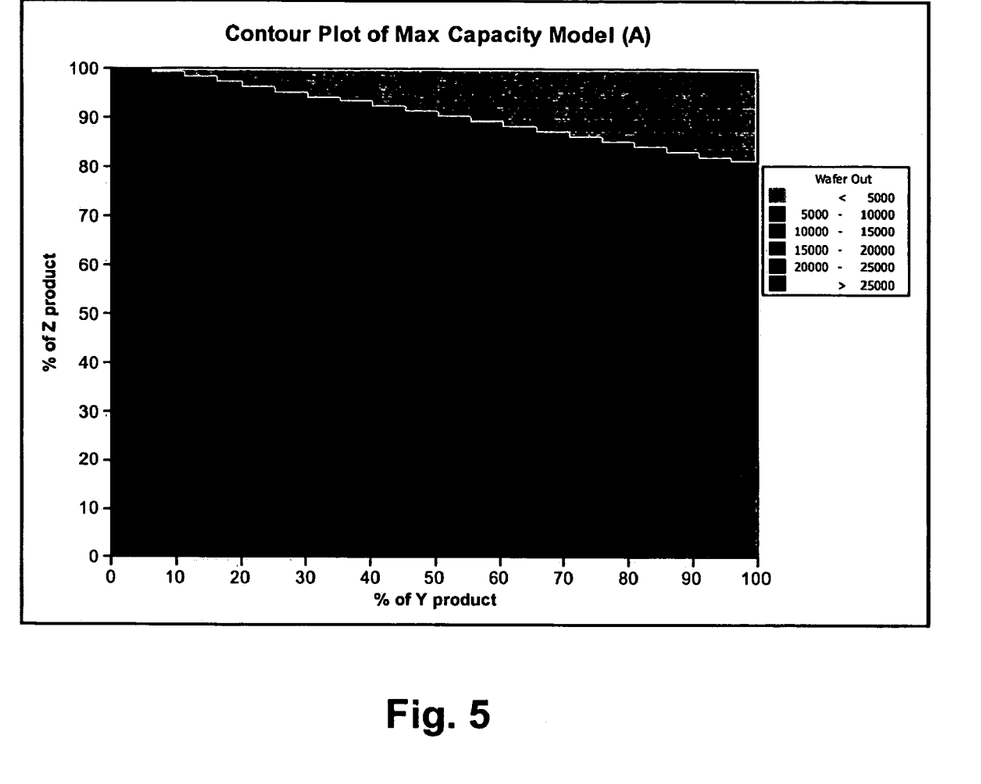
FIG. 5 is a contour plot of the data of FIG. 3.

FIG. 3 shows a series of mix combinations of the Z Product and the Y Product with reference to the X Product. For each combination the wafer output is calculated according to Equation I and the bottleneck capability is calculated in accordance with Equation 3. Once these values are determined for all mixes, a maximum mix combination is determined for maximum wafer output subject to the bottleneck capability not being exceeded. The data shown in FIG. 3 is represented as a surface plot in FIG. 4 and as a contour plot in FIG. 5.

By mathematical process of interpolation, the maximum wafer output is given for a percentage Product Group mix of X %: Y %: Z %=100%: 25.2%: 19.6%. This represents an optimized Product Group mix, compared with the initial mix from the initial capacity plan.

The result of the analysis is that a maximized wafer output of 25,445 units is achieved by an optimized mixed combination, as opposed to 24,800 units according to the mix of the initial capacity plan.

Maximum Profit

Taking into account the profit maximization aspect, the profit margins for each Product Group are calculated by the difference in the selling price and cost, in accordance with Equations 7, 8 and 9.

$$PF_X = ASP_X - STD\ COST_X \quad 7$$

$$PF_Y = ASP_Y - STD\ COST_Y \quad 8$$

$$PF_Z = ASP_Z - STD\ COST_Z \quad 9$$

Again, using the consumption sensitivity factors and capacity boundaries:

$$\text{MaximizeProfit}_i = X_i * PF_X + Y_i * PF_Y + Z_i * PF_z \quad 10$$

where i=any mix combination $$\text{Boundary(1): } CAPA_i = aX_i + bY_i + cZ_i \leq CAPA_0 \quad 11$$

$$\text{Boundary(2): } X_i \leq X_{max}, Y_i \leq Y_{max}, Z_i \leq Z_{max} \quad -12$$

Figure 6:
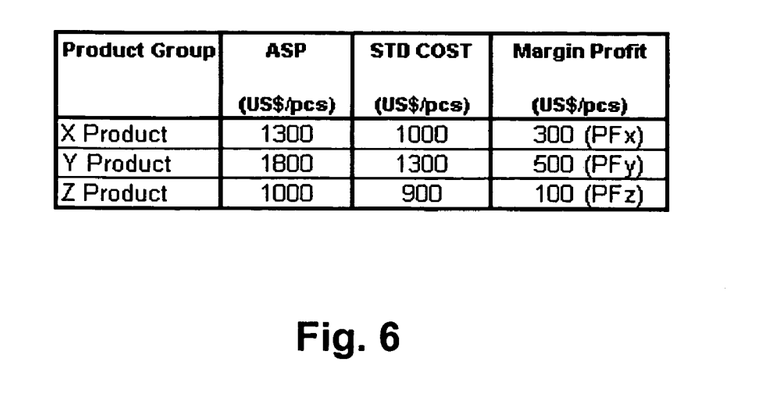
FIG. 6 is a tabulation of variables leading to the profit margin for Product Groups.

In the present example, this is shown in FIG. 6 as the values $PF_x$=300, $PF_y$=500 and $PF_z$=100.

Maximizing profit is determined algorithmically for mix combinations of Product Groups, in accordance with Equation 10. The profit margins act as weightings. The calculation is subject to the boundary conditions of the bottleneck capacity not exceeding the initial value (Equation 11), and that the mix components do not exceed respective maximum values (Equation 12).

Figure 7:
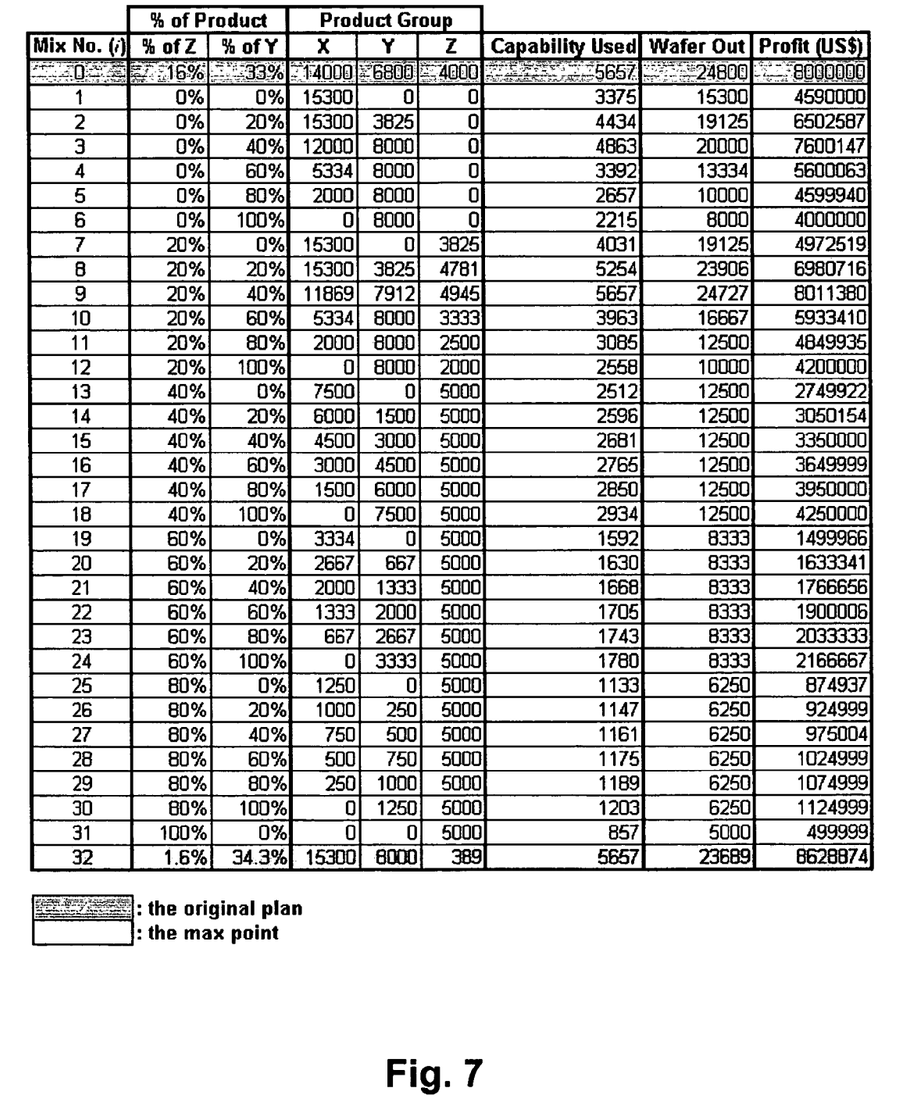
FIG. 7 is a tabulation of variables for various mix combinations leading to maximum profit.
Figure 8:
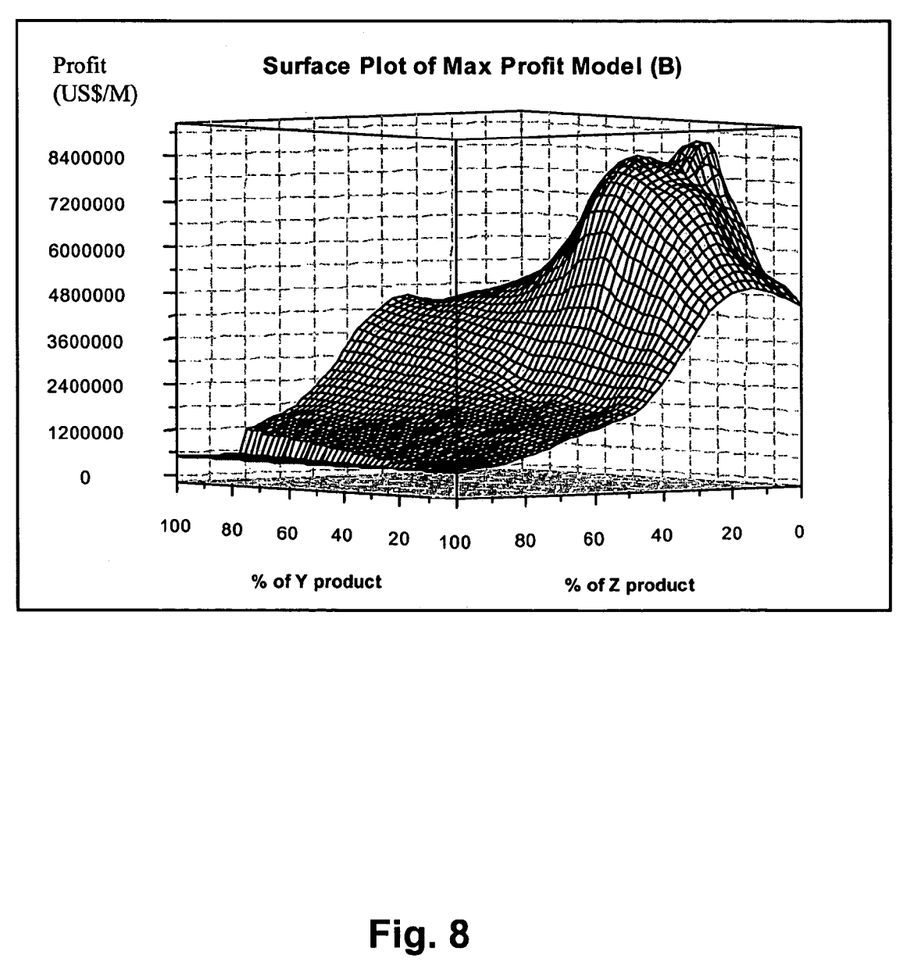
FIG. 8 is a surface plot of the data of FIG. 7.
Figure 9:
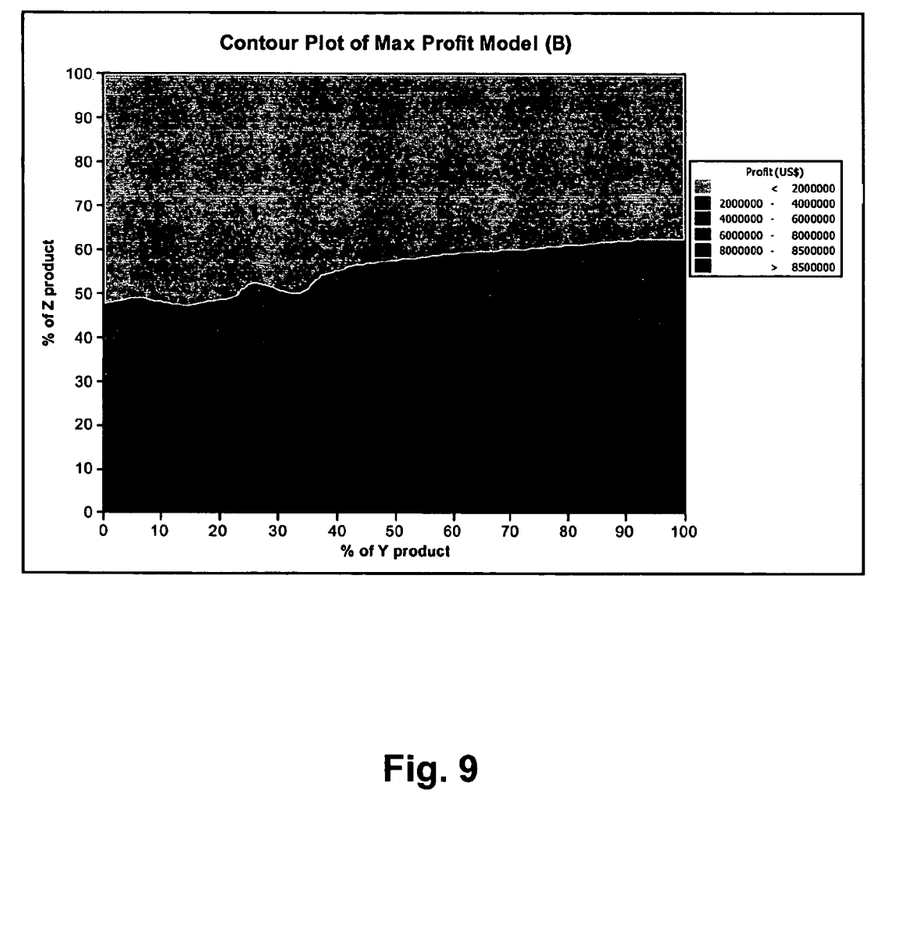
FIG. 9 is a contour plot of the data of FIG. 7.

FIG. 7 shows the same tabulation as FIG. 3, but with the profit calculation, according to Equation 10, performed and given in the last column. FIG. 8 is a surface plot representation of the percentage Y product and percentage said product mixes and the profit value. FIG. 9 is a contour plot of the same data of FIG. 8. The maximum profit point is calculated by interpolation and gives maximum profit for the percentage Product Group mixes, X %: Y %: Z %, of 100%: 34.3%: 1.6%.

The result of this analysis is that a maximum profit of approximately $US8.63 million is a achievable by an optimized Product Group mix as opposed to the US$8 million profit that would be achieved by the nominal Product Group mix according to the initial capacity plan.

It will be appreciated that the results obtained from the optimization processing in example embodiments of the present invention may be utilized in a number of ways. For example, where possible, the optimized Product Group mix may be implemented instead of the nominal Product Group mix according to the initial capacity plan. In practice, this may involve the results being considered during capacity management planning and possible feedback and interact with the demand plan management. It will further be appreciated that the results of the optimization processing in example embodiments may be utilized to facilitate forecasting in capacity management, and may also provide valuable feedback in terms of identifying higher and lower profitability Product Group mixes. This in turn may influence the type of product groups offered or focused on in the overall management of a wafer fabrication plant.

Computer Implementation

Figure 10:
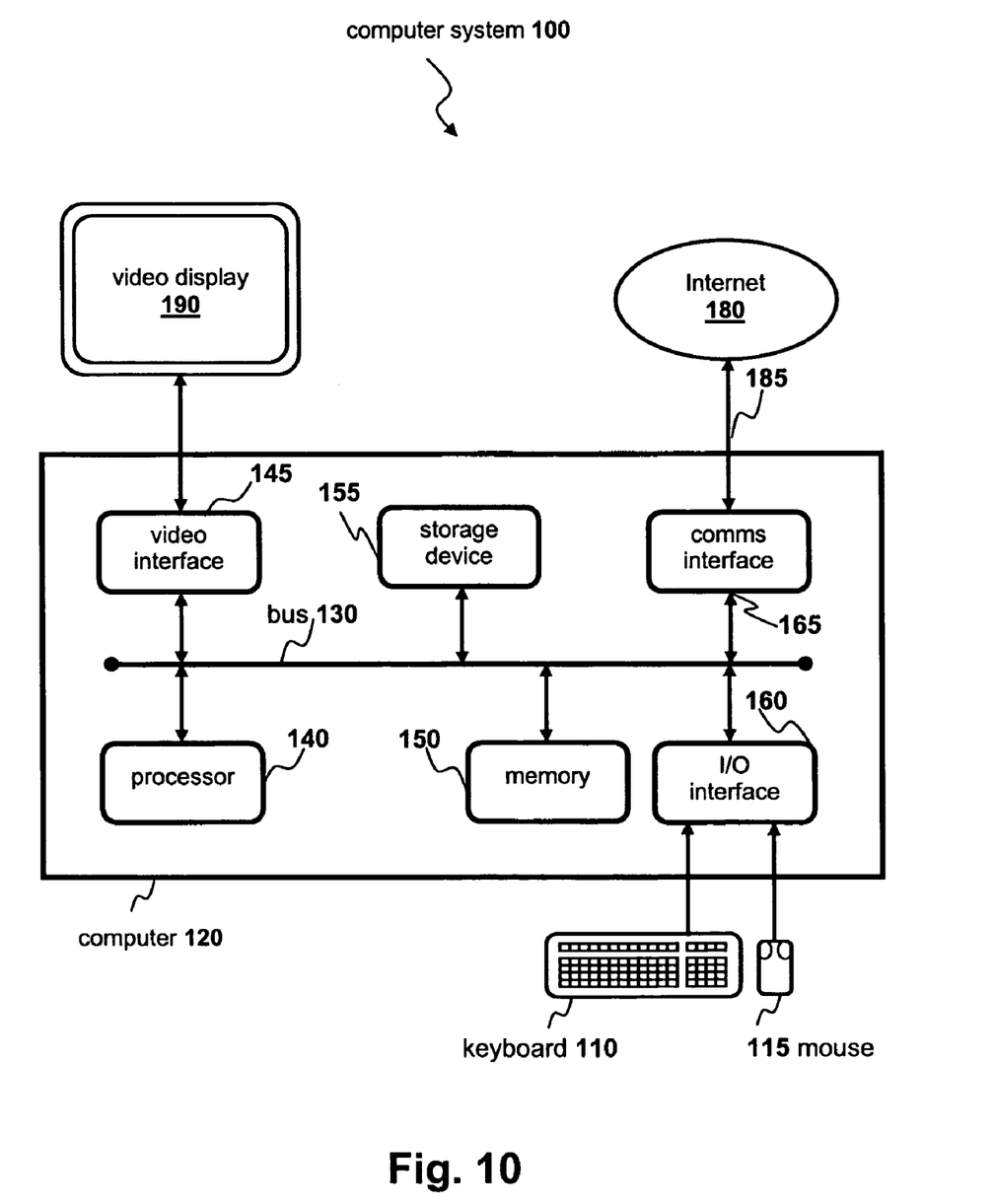
FIG. 10 is a schematic representation of a computer system suitable for performing the techniques described herein.

FIG. 10 is a schematic representation of a computer system 100 suitable for executing computer software programs. Computer software programs execute under a suitable operating system installed on the computer system 100, and may be thought of as a collection of software instructions for implementing particular steps.

The components of the computer system 100 include a computer 120, a keyboard 110 and mouse 115, and a video display 190. The computer 120 includes a processor 140, a memory 150, input/output (I/O) interface 160, communications interface 165, a video interface 145, and a storage device 155. All of these components are operatively coupled by a system bus 130 to allow particular components of the computer 120 to communicate with each other via the system bus 130.

The processor 140 is a central processing unit (CPU) that executes the operating system and the computer software program executing under the operating system. The memory 150 includes random access memory (RAM) and read-only memory (ROM), and is used under direction of the processor 140.

The video interface 145 is connected to video display 190 and provides video signals for display on the video display 190. User input to operate the computer 120 is provided from the keyboard 110 and mouse 115. The storage device 155 can include a disk drive or any other suitable storage medium.

The computer system 100 can be connected to one or more other similar computers via a communications interface 165 using a communication channel 185 to a network, represented as the Internet 180.

The computer software program may be recorded on a storage medium, such as the storage device 155. Alternatively, the computer software can be accessed directly from the Internet 180 by the computer 120. In either case, a user can interact with the computer system 100 using the keyboard 110 and mouse 115 to operate the computer software program executing on the computer 120. During operation, the software instructions of the computer software program are loaded to the memory 150 for execution by the processor 140.

Other configurations or types of computer systems can be equally well used to execute computer software that assists in implementing the techniques described herein. In the example embodiment, the optimization processing was implemented utilizing a Microsoft® Excel application program, including the Solver function in that application program.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A computer program product for the management of capacity in a wafer fabrication plant comprising a computer program stored on a storage medium, said computer program performing the steps of:
   (a) calculating a bottleneck capacity factor for an initial product group mix of an initial capacity plan, the bottleneck capacity factor representing available machine hours per a given time period for said initial capacity plan;
   (b) calculating maximum capacity values for respective product groups of the initial product group mix in the initial capacity plan, each respective maximum capacity value representing a maximum number of wafers of the respective product group output by said fabrication plant per said given time period;
   (c) algorithmically determining total output values for respective different product group mixes, including for the initial product group mix of the initial capacity plan, subject to said bottleneck capacity factor and said respective maximum capacity values not being exceeded, each total output value representing a sum of individual output values of all the product groups in the respective different product group mixes by said fabrication plant per said given time period;
   (d) determining a maximum one of said total output values; and
   (e) providing a modified product group mix, the product group mix being one of said different product group mixes corresponding to said maximum total output value.

2. A computer program product according to claim wherein said bottleneck capacity factor is calculated as the sum of weighted maximum capacities for the respective product groups of the initial product group mix.

3. A computer program product according to claim 2, wherein each said weighted maximum capacities is proportional to the sum of passes of a bottleneck tool for each piece of the respective product groups and is inversely proportional to production rates of the respective product groups.

4. A computer program product according to claim wherein, in step (c), said each total output value comprises a total wafer output value being the sum of individual wafer output values of all the product groups in the respective different product group mixes by said fabrication plant per said given time period.

5. A computer program product according to claim wherein, in step (c), said each total output value comprises a total profit value being the sum of individual profit values of all the product groups in the respective different product group mixes by said fabrication plant per said given time period.

6. A method of management of capacity in a wafer fabrication plant comprising a computer program stored on a storage medium, said computer program performing the steps of:
(a) calculating a bottleneck capacity factor for an initial product group mix of an initial capacity plan, the bottleneck capacity factor representing available machine hours per a given time period for said initial capacity plan;
(b) calculating maximum capacity values for respective product groups of the initial product group plan in the initial capacity plan, each respective maximum capacity value representing a maximum number of wafers of the respective product group output by said fabrication plant per said given time period;
(c) algorithmically determining total output values for respective different product group mixes, including for the initial product group mix of the initial capacity plan, subject to said bottleneck capacity factor and said respective maximum capacity values not being exceeded, each total output value representing a sum of individual output values of all the product groups in the respective different product group mixes by said fabrication plant per said given time period;
(d) determining a maximum one of said total output values; and
(e) utilizing a modified product group mix, the modified product group mix being one of said different product group mixes corresponding to said maximum total output value, in operation of the fabrication plant.

7. A method according to claim 6, wherein said bottleneck capacity factor is calculated as the sum of weighted maximum capacities for the respective product groups of the initial product group mix.

8. A method according to claim 7, wherein each said weighted maximum capacities is proportional to the sum of passes of a bottleneck tool for each piece of the respective product groups and is inversely proportional to production rates of the respective product groups.

9. A method according to claim 6, wherein, in step (c), said each total output value comprises a total wafer output value being the sum of individual wafer output values of all the product groups in the respective different product group mixes by said fabrication plant per said given time period.

10. A method according to claim 6, wherein, in step (c), said each total output value comprises a total profit value being the sum of individual profit values of all the product groups in the respective different product group mixes by said fabrication plant per said given time period.

* * * * *